(12) United States Patent
Dodonov et al.

(10) Patent No.: US 10,477,478 B2
(45) Date of Patent: Nov. 12, 2019

(54) METHOD OF PROCESSING SYSTEM REQUESTS IN A WIRELESS COMMUNICATION DEVICE

(71) Applicant: YANDEX EUROPE AG, Lucerne (CH)

(72) Inventors: Alexey Vladimirovich Dodonov, Moscow (RU); Dmitrii Valerievich Lapin, Moscow Region (RU)

(73) Assignee: YANDEX EUROPE AG, Lucerne (CH)

( * ) Notice: Subject to any disclaimer, the term of this patent is extended or adjusted under 35 U.S.C. 154(b) by 62 days.

(21) Appl. No.: 15/518,068

(22) PCT Filed: Feb. 9, 2015

(86) PCT No.: PCT/IB2015/050966
§ 371 (c)(1),
(2) Date: Apr. 10, 2017

(87) PCT Pub. No.: WO2016/059479
PCT Pub. Date: Apr. 21, 2016

(65) Prior Publication Data
US 2017/0265140 A1 Sep. 14, 2017

(30) Foreign Application Priority Data
Oct. 13, 2014 (RU) ................ 2014141124

(51) Int. Cl.
*H04W 52/02* (2009.01)
*H04W 88/02* (2009.01)

(52) U.S. Cl.
CPC ... *H04W 52/0251* (2013.01); *H04W 52/0274* (2013.01); *H04W 88/02* (2013.01); *Y02D 70/00* (2018.01)

(58) Field of Classification Search
None
See application file for complete search history.

(56) References Cited

U.S. PATENT DOCUMENTS 6,289,464 B1  9/2001  Wecker et al.
7,382,756 B2  6/2008  Barber et al.
(Continued)

FOREIGN PATENT DOCUMENTS

RU    2502228 C2   12/2013
RU    2517434 C2    5/2014
(Continued)

OTHER PUBLICATIONS

International Search Report with regard to PCT/IB2015/050966 dated Jun. 15, 2015.

*Primary Examiner* — David Bilodeau
(74) *Attorney, Agent, or Firm* — BCF LLP

(57) ABSTRACT

There is disclosed a method of operating and a method for reducing power consumption in a wireless communications device. The method comprises receiving a first system request for data from a data access application on a wireless communications device and storing the first system request in a memory of the wireless communications device without transmitting to the server until a first user request for data is received. Upon receiving the first user request for data, the wireless communications module of the wireless communications device is activated and both the first user request and the first system request are transmitted to the server. In cases where the first system request for data is determined to have high priority, then it is not stored and is transmitted to the server, regardless of whether a first user request has been received.

19 Claims, 4 Drawing Sheets

(56) References Cited

U.S. PATENT DOCUMENTS

| | | |
|---|---|---|
| 8,131,325 B2 | 3/2012 | Slack |
| 8,169,943 B2 | 5/2012 | Pelletier et al. |
| 8,611,240 B2 | 12/2013 | Anderson et al. |
| 2004/0204183 A1 | 10/2004 | Lencevicius et al. |
| 2006/0285526 A1 | 12/2006 | Jang et al. |
| 2007/0259673 A1 | 11/2007 | Willars et al. |
| 2009/0077401 A1 | 3/2009 | Tsai |
| 2010/0226297 A1 | 9/2010 | Kasslin et al. |
| 2011/0019557 A1 | 1/2011 | Hassan et al. |
| 2011/0055613 A1 | 3/2011 | Mandyam |
| 2011/0202730 A1 | 8/2011 | Sonoda et al. |
| 2012/0110360 A1 | 5/2012 | Lin et al. |
| 2012/0185577 A1* | 7/2012 | Giaretta ............... H04W 4/16 709/223 |
| 2012/0324267 A1 | 12/2012 | Mandyam |
| 2012/0331087 A1* | 12/2012 | Luna ............... H04L 67/2842 709/213 |
| 2013/0017804 A1 | 1/2013 | Jun et al. |
| 2013/0182572 A1 | 7/2013 | Backholm et al. |
| 2013/0308513 A1 | 11/2013 | Jheng et al. |
| 2013/0343574 A1 | 12/2013 | Muthugounder |
| 2014/0025977 A1 | 12/2014 | Mukherjee et al. |
| 2015/0055594 A1* | 2/2015 | Nirantar ............ H04W 52/0251 370/329 |
| 2015/0241941 A1* | 8/2015 | Luna ............... H04W 52/0229 713/320 |
| 2016/0165633 A1 | 6/2016 | Ostergaard et al. |
| 2017/0251434 A1* | 8/2017 | Luna ............... H04W 52/0258 |

FOREIGN PATENT DOCUMENTS

| | | |
|---|---|---|
| WO | 2014044101 A1 | 3/2014 |
| WO | 2014067876 A1 | 5/2014 |

\* cited by examiner

METHOD OF PROCESSING SYSTEM REQUESTS IN A WIRELESS COMMUNICATION DEVICE

CROSS-REFERENCE

The present application claims convention priority to Russian Patent Application No. 2014141124, filed Oct. 13, 2014, entitled "METHOD OF PROCESSING SYSTEM REQUESTS IN A WIRELESS COMMUNICATIONS DEVICE" which is incorporated by reference herein in its entirety.

FIELD OF THE TECHNOLOGY

The present technology relates to a method of and a system for processing system requests and/or reducing power consumption in a wireless communications device.

BACKGROUND

Worldwide use of wireless communication devices such as smartphones, tablet computers, and other digital electronic devices continues to increase steadily, as such devices become more powerful and less expensive. Today, it is not uncommon for a single wireless communications device to provide multiple services to a user, such as voice calling, text messaging, email, internet access, instant messaging, multimedia content presentation, and nearly any other function that may have been reserved in the past to a desktop computer, a television, or a landline telephone.

Such communication devices typically request data from a network, e.g., via radio resources. Current devices generally request data from the network "on demand" without regard to current conditions and status of the wireless device or power consumption. There is a need for methods and systems for more efficiently processing requests for wireless communications resources and/or reducing power consumption in a wireless communications device.

U.S. Pat. No. 8,169,943 teaches a method and device for saving power in a wireless user terminal, in which there can be at least one controlling node, which serves to control the transmissions to and from the user terminal. A user terminal can be in an "off" state in which it does not listen for data from its controlling node, or an "on" state in which it listens for data from its controlling node, each state being assumed for a certain amount of time. The user terminal switches between the off state and the on state at periodic intervals according to a predetermined discontinuous reception cycle for mixed data including pre-defined on and off periods, where the on period is extended if non-real time data is received.

U.S. Pat. No. 8,131,325 teaches a method, apparatus and system for battery resource management via traffic steering, where a wireless device is configured to request content from an intermediation server, which is configured to analyze the requested content and send an indication to the wireless device as to which bearer path is to be selected based on which bearer path (e.g., EDGE or 3G) is battery-life optimized.

U.S. Patent Application Publication No. 2013/0017804 teaches a system for efficiently processing radio resource requests. Requests for data access from a wireless communications device are aggregated to more efficiently use radio resources, wherein aggregated requests may not be transmitted until a total number of requests or size of aggregated requests exceeds a threshold. Regardless of aggregation, requests may be stored until a timer expires, and then transmitted to the radio access network. Request priority, environmental data, and device data may be taken into account in determining when to transmit requests for data access.

SUMMARY

It is thus an object of the present technology to ameliorate at least some of the inconveniences present in the prior art.

Generally speaking, embodiments of the present technology provide a method of operating a wireless communications device. More specifically, embodiments of the present technology involve operating a wireless communications device having a wireless communications module for communication with a server over a wireless network and a processor, operatively coupled to the wireless communications module, the processor being configured to execute a data access application. According to embodiments of the present technology, the method comprises: a) receiving a first system request for data from the data access application on the wireless communications device; b) storing the first system request in a memory of the wireless communications device without transmitting to the server; c) receiving a first user request for data from the data access application on the wireless communications device; d) activating the wireless communications module of the wireless communications device; e) transmitting to the server both the first user request and the first system request; and f) inactivating the wireless communications module.

In some implementations of the method, responsive to a response from the server being required after the transmitting step, the inactivating step is executed after the response from the server is received.

In some implementations of the method, a first priority of the first system request for data is determined, before storing the first system request in the memory of the wireless communications device. Responsive to a determination that the first priority is low, the method continues with step b) of storing the first system request in the memory of the wireless communications device without transmitting to the server. In alternative implementations of the method, responsive to a determination that the first priority is high, the first system request is not stored in the memory of the wireless communications device; the wireless communications module of the wireless communications device is activated; and the first system request is transmitted to the server, before or regardless of whether the first user request has been received in step c).

In some implementations of the method, a second system request for data is received from the data access application on the wireless communications device and stored in the memory of the wireless communications device without transmitting to the server. In such implementations, the second system request for data is later transmitted to the server with the first user request and the first system request, e.g., in step e).

In further implementations of the method, a second priority of the second system request for data is determined, before storing the second system request in the memory of the wireless communications device. Responsive to a determination that the second priority is low, the method continues with the step of storing the second system request in the memory of the wireless communications device without transmitting to the server. In alternative implementations of the method, responsive to a determination that the second priority is high, the second system request is not stored in the memory of the wireless communications device; the wireless communications module of the wireless communications device is activated; and both the second system request and the stored first system request are transmitted to the server, before or regardless of whether the first user request has been received in step c).

According to another broad aspect of the present technology, there is provided a method for reducing power consumption in a wireless communications device. More specifically, embodiments of the present technology involve reducing power consumption in a wireless communications device having a wireless communications module for communication with a server over a wireless network and a processor, operatively coupled to the wireless communications module, the processor being configured to execute a data access application. According to embodiments of the present technology, the method comprises receiving a first system request for data from the data access application on the wireless communications device; b) storing the first system request in a memory of the wireless communications device without transmitting to the server; c) receiving a first user request for data from the data access application on the wireless communications device; d) activating the wireless communications module of the wireless communications device; e) transmitting to the server both the first user request and the first system request; and f) inactivating the wireless communications module.

According to another broad aspect of the present technology, there is provided a wireless communications device comprising: a wireless communications module for communication with a server over a wireless network; and a processor, operatively coupled to the wireless communications module, the processor being configured to execute an operating system of the wireless communications device and a data access application, the data access application being configured to receive a first system request for data from the operating system of the wireless communications device; store the first system request in a memory of the wireless communications device, without transmitting to the server; receive a first user request for data; activate the wireless communications module of the wireless communications device; transmit to the server both the first user request and the first system request; and inactivate the wireless communications module.

In some implementations, the wireless communications device is further configured to determine if a response from the server is required, in response to the first user request and the first system request that have been transmitted to the server. In such implementations, responsive to a response from the server being required, the wireless communications device is configured to execute the step of inactivating after the response from the server is received.

In some implementations, the wireless communications device is further configured to determine a first priority of the first system request, before storing the first system request in the memory of the wireless communications device without transmitting to the server. In such implementations, responsive to a determination that the first priority is low, the wireless communications device is configured to store the first system request in the memory of the wireless communications device without transmitting to the server. Responsive to a determination that the first priority is high, the wireless communications device is configured to: not store the first system request in the memory of the wireless communications device; activate the wireless communications module of the wireless communications device; and transmit the first system request to the server, before the first user request is received.

In some implementations, the wireless communications device is further configured to, before receiving the first user request for data, receive a second system request for data from the operating system of the wireless communications device; and store the second system request in the memory of the wireless communications device without transmitting to the server. In such implementations, the wireless communications device is configured to transmit the second system request to the server with the first user request and the first system request.

In some implementations, the wireless communications device is further configured to, before storing the second system request in the memory of the wireless communications device without transmitting to the server, determine a second priority of the second system request for data. In such implementations, responsive to a determination that the second priority is low, the wireless communications device is configured to store the second system request in the memory of the wireless communications device without transmitting to the server. Responsive to a determination that the second priority is high, the wireless communications device is configured to: not store the second system request in the memory of the wireless communications device; activate the wireless communications module of the wireless communications device; and transmit both the second system request and the stored first system request to the server, before the first user request is received.

In the context of the present specification, unless specifically provided otherwise, a "server" is a computer program that is running on appropriate hardware and is capable of receiving requests (e.g., from user devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "a server".

In the context of the present specification, unless specifically provided otherwise, "wireless communications device" is any computer hardware that is capable of running software appropriate to the relevant task at hand. Thus, some (non-limiting) examples of wireless communications devices include personal computers (desktops, laptops, netbooks, etc.), smartphones, and tablets, as well as network equipment such as routers, switches, and gateways. It should be noted that a device acting as a user device in the present context is not precluded from acting as a server to other user devices. The use of the expression "a user device" or "a wireless communications device" does not preclude multiple user devices being used in receiving/sending, carrying out or causing to be carried out any task or request, or the consequences of any task or request, or steps of any method described herein.

In the context of the present specification, unless specifically provided otherwise, the expression "component" is meant to include software (appropriate to a particular hardware context) that is both necessary and sufficient to achieve the specific function(s) being referenced.

In the context of the present specification, unless specifically provided otherwise, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
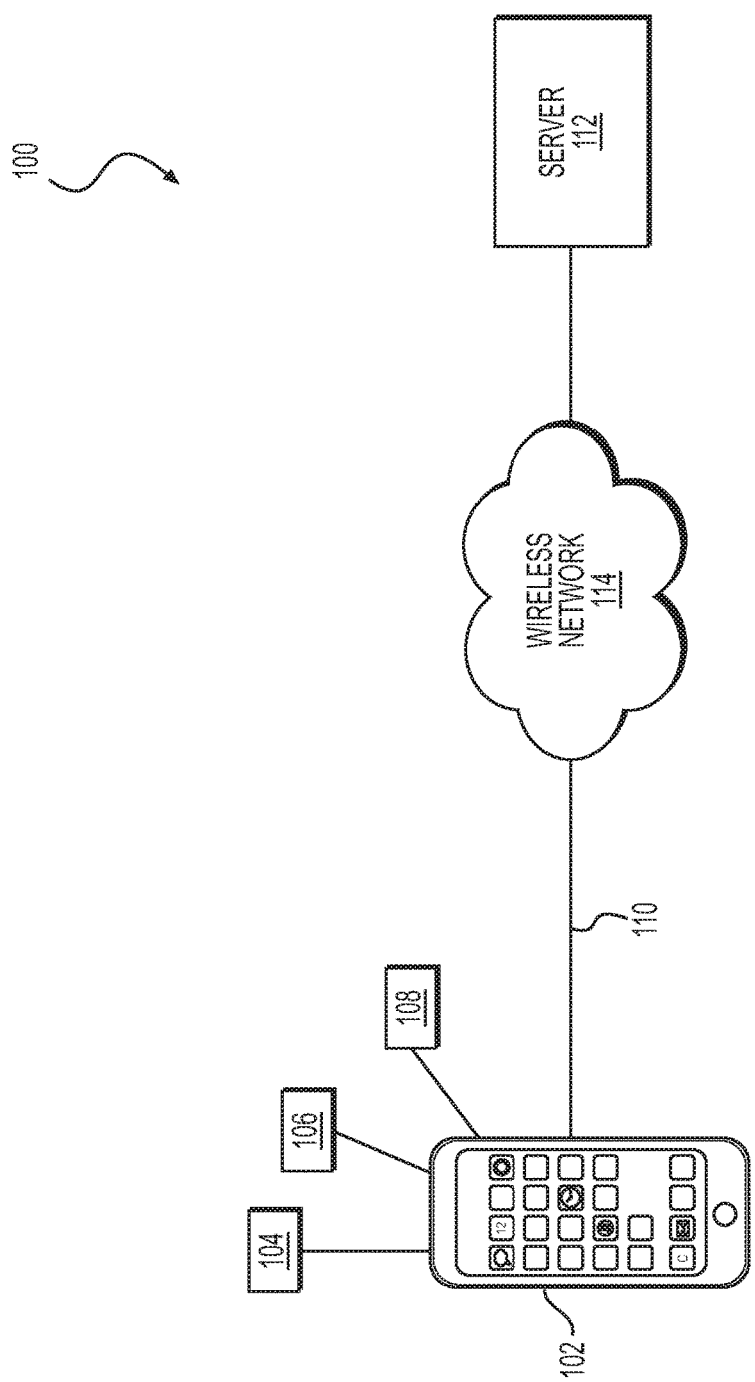
FIG. 1 is a schematic diagram of a system 100 implemented in accordance with an embodiment of the present technology.

Referring to FIG. 1, there is shown a diagram of a system 100, the system 100 being suitable for implementing non-limiting embodiments of the present technology. It is to be expressly understood that the system 100 is depicted as merely as an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the system 100 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e., where no examples of modifications have been set forth), it should not be interpreted that no modifications are possible and/or that what is described is the sole manner of implementing that element of the present technology. As a person skilled in the art would understand, this is likely not the case. In addition it is to be understood that the system 100 may provide in certain instances simple implementations of the present technology, and that where such is the case they have been presented in this manner as an aid to understanding. As persons skilled in the art would understand, various implementations of the present technology may be of a greater complexity.

The system 100 comprises a wireless communications device 102. The wireless communications device 102 is typically associated with a user (not depicted) and, as such, can sometimes be referred to as a "user device". It should be noted that the fact that the wireless communications device 102 is associated with the user does not need to suggest or imply any mode of operation—such as a need to log in, a need to be registered or the like.

The implementation of the wireless communications device 102 is not particularly limited, but as an example, the wireless communications device 102 may be implemented as a cell phone, a smartphone, a tablet and the like.

Merely for the purposes of an illustration, it shall be assumed that the wireless communications device 102 is implemented as a smartphone, for example iPhone 5 smartphone, running iOS 6 (i.e., factory pre-set operating system), provided by Apple Corporation of Cupertino, Calif., United States of America. The wireless communications device 102 comprises hardware and/or software and/or firmware (or a combination thereof), as is known in the art, to execute a plurality of applications 104.

Figure 2:
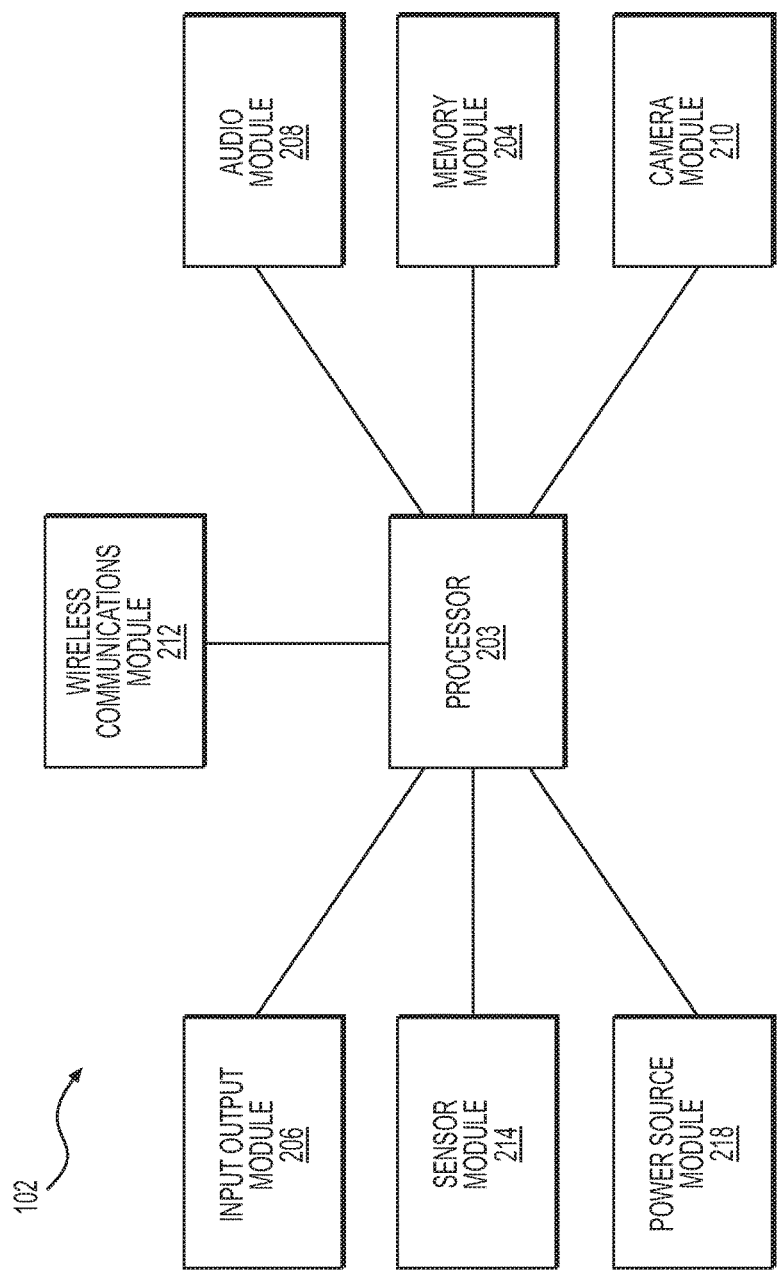
FIG. 2 is a block diagram of a non-limiting embodiment of hardware components of a wireless communications device 102 of the system 100 of FIG. 1.

In a specific embodiment and with brief reference to FIG. 2, a schematic diagram of the wireless communications device 102 will be described. The electronic device 102 may comprise a processor 203. In a particular embodiment, the processor 203 may comprise one or more processors and/or one or more microcontrollers configured to execute instructions and to carry out operations associated with the operation of the wireless communications device 102. In various embodiments, processor 203 may be implemented as a single-chip, multiple chips and/or other electrical components including one or more integrated circuits and printed circuit boards. Processor 203 may optionally contain a cache memory unit (not depicted) for temporary local storage of instructions, data, or computer addresses. By way of example, the processor 203 may include one or more processors or one or more controllers dedicated for certain processing tasks of the wireless communications device 102 or a single multi-functional processor or controller. In a particular embodiment, the processor 203 is configured to execute an operating system of the wireless communications device 102 and to execute a data access application 108 (described further below).

The processor 203 is operatively coupled to a memory module 204. Memory module 204 may encompass one or more storage media and generally provide a place to store computer code (e.g., software and/or firmware). By way of example, the memory module 204 may include various tangible computer-readable storage media including Read-Only Memory (ROM) and/or Random-Access Memory (RAM). As is well known in the art, ROM acts to transfer data and instructions uni-directionally to the processor 203, and RAM is used typically to transfer data and instructions in a bi-directional manner. Memory module 204 may also include one or more fixed storage devices in the form of, by way of example, hard disk drives (HDDs), solid-state drives (SSDs), flash-memory cards (e.g., Secured Digital or SD cards, embedded MultiMediaCard or eMMC cards), among other suitable forms of memory coupled bi-directionally to the processor 203. Information may also reside on one or more removable storage media loaded into or installed in the wireless communications device 102 when needed. By way of example, any of a number of suitable memory cards (e.g., SD cards) may be loaded into the electronic device 102 on a temporary or permanent basis.

The memory module 204 may store inter alia a series of computer-readable instructions, which instructions when executed cause the processor 203 (as well as other components of the wireless communications device 102) to execute the various operations described herein.

The wireless communications device 102 further comprises an input output module 206. Input output module 206 may comprise one or more input and output devices operably connected to processor 203. For example, input-output module 206 may include keyboard, mouse, one or more buttons, thumb wheel, and/or display (e.g., liquid crystal display (LCD), light emitting diode (LED), Interferometric modulator display (IMOD), or any other suitable display technology). Generally, input devices are configured to transfer data, commands and responses from the outside world into wireless communications device 102. The display is generally configured to display a graphical user interface (GUI) that provides an easy to use visual interface between a user of the wireless communications device 102 and the operating system or application(s) running on the wireless communications device 102. Generally, the GUI presents programs, files and operational options with graphical images. During operation, the user may select and activate various graphical images displayed on the display in order to initiate functions and tasks associated therewith. Input output module 206 may also include touch based devices such as touchpad and touch screen. A touchpad is an input device including a surface that detects touch-based inputs of users. Similarly, a touch screen is a display that detects the presence and location of user touch inputs. Input output module 206 may also include dual touch or multi-touch displays or touchpads that can identify the presence, location and movement of more than one touch inputs, such as two or three finger touches.

In the particular embodiment of the wireless communications device 102 being implemented as a smartphone, the input output module 206 can be implemented as a touch-sensitive screen.

In particular embodiments, wireless communications device 102 may additionally comprise an audio module 208, a camera module 210, a wireless communication module 212, and/or sensor modules 214, all operably connected to the processor 203 to facilitate various functions of wireless communications device 102.

For example, the camera module 210, including an optical sensor (e.g., a charged coupled device (CCD), or a complementary metal-oxide semiconductor (CMOS) image sensor), can be utilized to facilitate camera functions, such as recording photographs and video clips.

Additionally, wireless communications device 102 may be powered by a power source module 218, which can be executed as rechargeable battery or the like.

The wireless communications module 212 transmits and/or receives communications via the communications link 110. Depending on the particular wireless communications device 102, the wireless communications module 212 may support one or more of: radio signaling; wireless Internet access; and short-range communications. For example, the wireless communications module 212 may transmit and/or receive radio signals to and/or from a base station, such as an external terminal or a server 112. Without limitations, such radio signals may include a voice call signal, a video call signal or various types of data according to text and/or multimedia message transmission and/or reception. In some implementations, the wireless communications module 212 may support wireless Internet access for the wireless communications device 102. The wireless Internet access technique implemented may include, e.g., a WLAN (Wireless LAN) (Wi-Fi), Wibro (Wireless broadband), Wimax (World Interoperability for Microwave Access), HSDPA (High Speed Downlink Packet Access), or the like. In some implementations, the wireless communications module 212 may support short-range communications. Some examples of short-range communication technology include Bluetooth™, Radio Frequency IDentification (RFID), Infrared Data Association (IrDA), Ultra-WideBand (UWB), ZigBee™, and the like.

In some implementations, wireless communications module 212 can be designed to operate over one or more wireless networks 114, for example, a wireless PAN (WPAN) (such as, for example, a BLUETOOTH WPAN, an infrared PAN), a WI-FI network (such as, for example, an 802.11a/b/g/n WI-FI network, an 802.11s mesh network), a WI-MAX network, a cellular telephone network (such as, for example, a Global System for Mobile Communications (GSM) network, an Enhanced Data Rates for GSM Evolution (EDGE) network, a Universal Mobile Telecommunications System (UMTS) network, and/or a Long Term Evolution (LTE) network). In some implementations, wireless communications module 212 is a radio module. Additionally, wireless communications module 212 may include hosting protocols such that wireless communications device 102 may be configured as a base station for other wireless devices.

It should be understood that the wireless communications module 212 is not particularly limited. Systems and methods for operating and/or reducing power consumption in a wireless communications device 102 may be applied independently of the method of data transport, and do not depend on any particular network architecture, or underlying protocols. Further, the implementation of the wireless communications module 212 is not meant to be particularly limited. For example, the wireless communications module 212 may be one physical module or system, or may be a plurality of physical modules or systems. In the present context, the use of the expression a "wireless communications module" is not intended to mean that every communication or signal will have been received or sent by the same wireless communications module; it is intended to mean that any number of software elements or hardware devices may be involved in receiving and sending communications and signals, and all of this software and hardware may be one wireless communications module or multiple wireless communications modules, both of which are included within the expression "a wireless communications module".

Sensor module 214 may include one or more sensor devices to provide additional input and facilitate multiple functionalities of the wireless communications device 102.

In particular embodiments, various components of wireless communications device 102 may be operably connected together by one or more buses (including hardware and/or software). As an example and not by way of limitation, the one or more buses may include an Accelerated Graphics Port (AGP) or other graphics bus, an Enhanced Industry Standard Architecture (EISA) bus, a front-side bus (FSB), a HYPER-TRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, a Universal Asynchronous Receiver/Transmitter (UART) interface, a Inter-Integrated Circuit ($I^2C$) bus, a Serial Peripheral Interface (SPI) bus, a Secure Digital (SD) memory interface, a MultiMediaCard (MMC) memory interface, a Memory Stick (MS) memory interface, a Secure Digital Input Output (SDIO) interface, a Multi-channel Buffered Serial Port (McBSP) bus, a Universal Serial Bus (USB) bus, a General Purpose Memory Controller (GPMC) bus, a SDRAM Controller (SDRC) bus, a General Purpose Input/Output (GPIO) bus, a Separate Video (S-Video) bus, a Display Serial Interface (DSI) bus, an Advanced Microcontroller Bus Architecture (AMBA) bus, or another suitable bus or a combination of two or more of these.

Returning to the description of FIG. 1, the wireless communications device 102 is coupled to a wireless network (also referred to as a "wireless communications network") 114 via a communications link 110, for example, via the wireless communications module 212. In some non-limiting embodiments of the present technology, the wireless network 114 can be implemented as a cellular telephone network (such as, for example, a Global System for Mobile Communications (GSM) network, an Enhanced Data Rates for GSM Evolution (EDGE) network, a Universal Mobile Telecommunications System (UMTS) network, and/or a Long Term Evolution (LTE) network). In other embodiments of the present technology, the wireless network 114 can be implemented differently and teachings presented herein are not limited to any particular type of the wireless network 114.

How the communications link 110 is implemented is not particularly limited and will depend on how the wireless communications device 102 is implemented. The communications link 110 can be implemented, for example, as one or more base stations within the cellular telephone network and the wireless communication device 102 can connect thereto via the aforementioned wireless communications module 212, as is very well known to those of skill in the art.

It should be expressly understood that implementations for the wireless communications device 102, the communications link 110 and the wireless network 114 are provided for illustration purposes only. As such, those skilled in the art will easily appreciate other specific implementational details for the wireless communications device 102, the communications link 110 and the wireless network 114. As such, by no means should examples provided hereinabove be used to limit the scope of the present technology.

Returning to the description of FIG. 1, it shall be assumed that each of the plurality of applications 104 has been either preinstalled on the wireless communications device 102 or downloaded by the user of the wireless communications device 102.

The wireless communications device 102 is also configured to execute a search application 106. Generally speaking, the purpose of the search application 106 is to enable the user (not depicted) to execute a web search using a search engine. How the search application 106 is implemented is not particularly limited. One example of the search application 106 may be embodied in a user accessing a web site associated with a search engine to access the search application 106. For example, the search application can be accessed by typing in an URL associated with Yandex™ search engine at www.yandex.ru. It should be expressly understood that the search application 106 can be accessed using any other commercially available or proprietary search engine. Generally speaking, the search application 106 is configured to receive from the user (not depicted) a "search string" and to provide search results that are responsive to the user query. How the user query is processed and how the search results are presented is generally known in the art.

The wireless communications device 102 is also configured to execute a data access application 108. In some implementations, the data access application 108 can be executed as part of the operating system executed by the processor 203. In other implementations, the data access application 108 can be preinstalled/factory installed or can itself be downloaded from an application repository by a user (not shown). A data access application 108 can be provided by the same entity as the one providing wireless communications device 102 or its operating system or by another entity. Further, a data access application 108 can be composed of one piece of software or module, or multiple pieces of software or modules which together execute the required functions. Implementation of the data access application 108 is not meant to be particularly limited.

Generally speaking, the purpose of the data access application 108 is to receive the system and user requests for data and control the wireless communications module 212, thereby controlling access to the communications link 110 and the wireless network 114, as implemented in accordance with non-limiting embodiments of the present technology. In accordance with the methods provided herein, as further described below, the data access application 108 can execute one or more of the following actions: receive system requests for data and user requests for data; determine priority of system requests, and take appropriate action in accordance with the determined priority; store a system request for data in a memory (not shown) of the wireless communications device 102, as appropriate; activate and inactivate the wireless communications module 212 of the wireless communications device 102; transmit (or cause to be transmitted) requests for data to the server 112; and/or determine whether response from the server 112 is required in response to the transmitted requests for data.

A "memory" of the wireless communications device 102 may be implemented as the aforementioned memory module 204. In a specific non-limiting example to be presented herein, it shall be assumed that the memory module 204 is implemented as a cache memory unit of the processor 203. However, in the context of the present specification, unless specifically provided otherwise, the expression "a memory" is intended to include any such suitable memory unit or module for temporary local storage of system requests for data on the wireless communications device 102.

For the sake of illustration and not a limitation, the following examples of the data access application 108 responding to requests for data are possible: receiving a system request for data; responsive to a determination that the priority of a system request for data is low, storing the system request in a memory of the wireless communications device 102, without transmitting the system request to the server 112; receiving a user request for data; upon receiving a user request for data, activating the wireless communications module 212 of the wireless communications device 102, and transmitting the user request for data and any stored system requests for data to the server 112; and inactivating the wireless communications module 212 after transmission. In some implementations, the data access application 108 may determine if a response from the server 112 is required after transmitting the requests for data and, responsive to a determination that response from the server 112 is required, keep the wireless communications module 212 active until the response is received.

Generally speaking, embodiments of the present technology provide a method of operating a wireless communications device 102, the wireless communications device 102 having a wireless communications module 212 for communication with a server 112 over a wireless network 114 and a processor 203 configured to execute a data access application 108. There are also provided methods of reducing power consumption in a wireless communications device 102, the wireless communications device 102 having a wireless communications module 212 for communication with a server 112 over a wireless network 114 and a processor 203 configured to execute a data access application 108.

Figure 3:
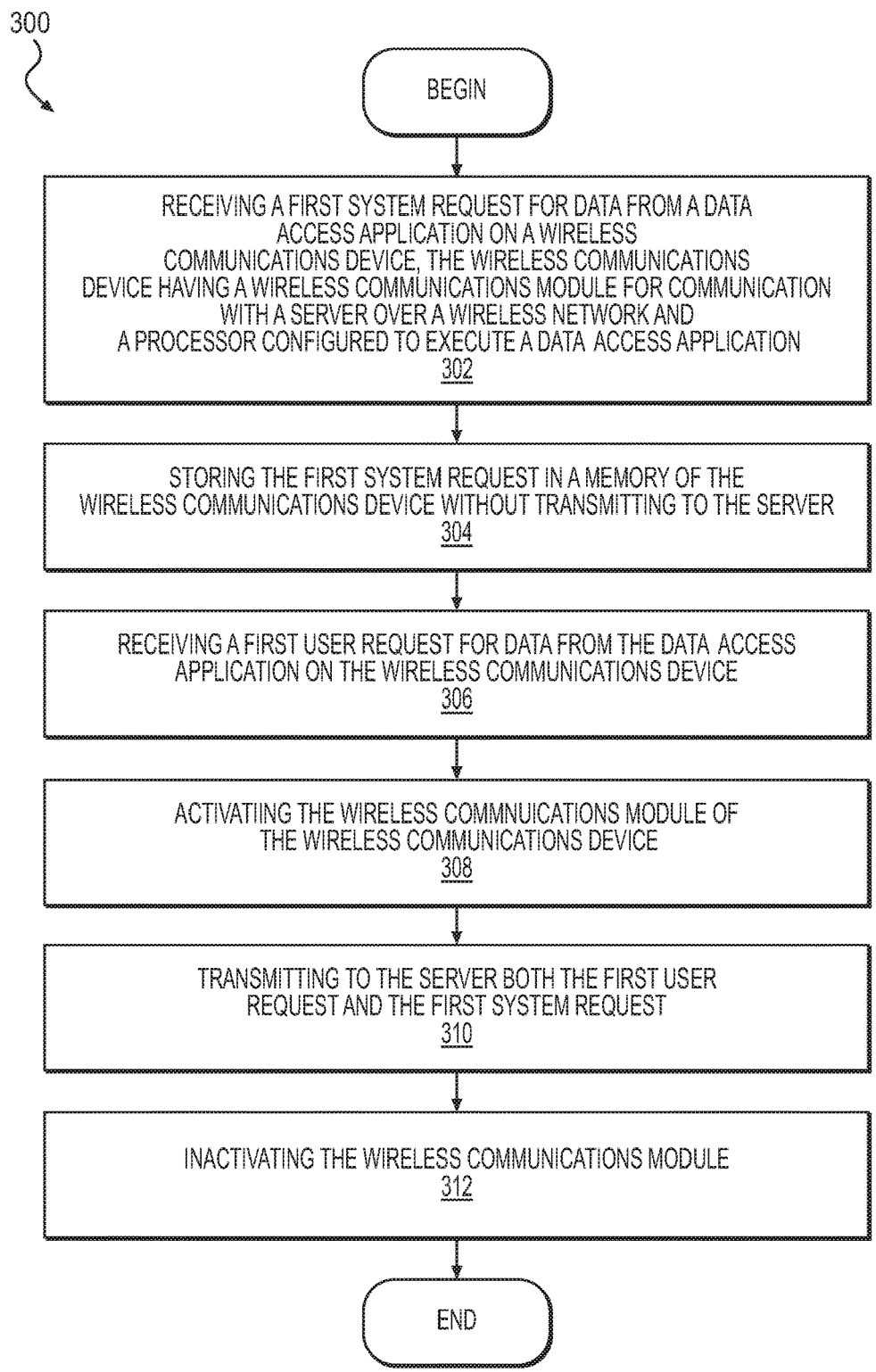
FIG. 3 depicts a flow chart of one embodiment of a method 300, the method 300 being executable within the system 100 of FIG. 1, the method 300 being implemented in accordance with non-limiting embodiments of the present technology.

Turning now to FIG. 3, the method 300 is implemented by the wireless communications device 102. In some embodiments of the present technology, the method 300 can be executed by the data access application 108.

Step 302—Receiving a First System Request for Data from a Data Access Application on a Wireless Communications Device The method 300 begins at step 302, where a first system request for data is received by the data access application 108 on the wireless communications device 102.

In the context of the present specification, unless specifically provided otherwise, a "request for data" is meant to include any request or requirement for accessing wireless network 114 via communications link 110 and wireless communications module 212. Without limitation, a request for data may include a request for data transmission, a request for data retrieval, a request for information, a request for access to a telephone network such as a cellular network, and so on. In some implementations, a request for data includes a request or requirement to access the server 112 via wireless network 114 and communications link 110, for example to retrieve data, to store data, etc.

In the context of the present specification, unless specifically provided otherwise, a "system" request for data is meant to include a request for data made by the operating system of wireless communications device 102, or by another system or application required for general operation of the wireless communications device 102. Generally speaking, a system request for data originates from the wireless communication device 102's systems and software, rather than from the user. Put another way, the system request is transparent to the user—it is not linked to a particular task performed by the user using the wireless communications device 102. Put another way, the system request is not directly linked to a particular user request or a particular user task performed on the wireless communications device 102.

In contrast, a "user" request for data is meant to include a request for data originating from the user or from a task directly linked to the user. For example, a user may wish to execute a web search using a search engine or execute a search application 106, download a file such as a music file or an application, send an email, make a phone call or a Voice-over-IP call, or perform another similar action (of which there are many) that requires activating wireless communications module 212 in order to access wireless network 114 via communications link 110.

In some embodiments of the present technology, it is possible that a specific user request may trigger a system request to be generated, the system request being instrumental in the wireless communications device 102 being able to execute the user request. Certain system requests may also be directly linked to the user request. Within such a scenario, such system requests that are triggered or are otherwise linked to the user request(s) or user tasks may be treated together with the user request as part of the user request and not as a separate system request.

The method 300 then proceeds to step 304.

Step 304—Storing the First System Request in a Memory of the Wireless Communications Device without Transmitting to the Server Next, at step 304, the first system request is stored in a memory (not depicted) of the wireless communications device 102 without transmitting to the server 112.

The method 300 then proceeds to step 306.

Step 306—Receiving a First User Request for Data from the Data Access Application on the Wireless Communications Device Next, at step 306, a first user request for data is received from the data access application 108 on the wireless communications device 102. The first user request may have been originated by one of the plurality of applications 104 or the search application 106. Alternatively, the first user request may have been originated by a component of the wireless communications device 102, for example, in response to the user placing a Voice-over-IP call.

The method 300 then proceeds to step 308.

Step 308—Activating the Wireless Communications Module of the Wireless Communications Device Next, at step 308, upon receiving a first user request for data, the wireless communications module 212 is activated. In some implementations, the wireless communications module 212 is activated by the data access application 108.

The method 300 then proceeds to step 310.

Step 310—Transmitting to the Server Both the First User Request and the First System Request Next, at step 310, upon activating the wireless communications module 212 of the wireless communications device 102, both the first user request and the first system request are transmitted to the server 112 (e.g., via communications link 110 and wireless network 114).

In some implementations of the method 300, a first user request for data is received before a first system request for data has been received. In this case, the wireless communications module 212 of the wireless communications device 102 is activated and the first user request for data is transmitted to the server 112 in step 310, regardless of the absence of a stored first system request for data.

In alternative implementations of the method 300, a first user request for data and a first system request for data may be received at the same time. In this case, responsive to the first user request for data having been received, the wireless communications module 212 of the wireless communications device 102 is activated and the first user request for data is transmitted to the server 112 in step 310 along with the first system request for data, without storing the first system request for data in a memory of the wireless communications device 102 (in other words, step 304 is skipped).

In further implementations of the method 300, a plurality of system requests for data may have been stored in a memory of the wireless communications device 102 before a first user request for data is received. In this case, all the stored system requests for data are transmitted to the server 112 with the first user request for data. In such implementations, any system requests for data received at the same time as the first user request for data are also transmitted to the server 112 with the first user request for data in step 310, without being stored in a memory of the wireless communications device 102.

In some implementations, a plurality of user requests for data may be received at the same time. In this case, all the user requests for data are transmitted to the server 112 in step 310. In other words, if a second user request for data, a third user request for data, etc., are received at the same time as the first user request for data, then all three (or more) user requests for data are transmitted to the server in step 310.

The method 300 then proceeds to step 312.

Step 312—Inactivating the Wireless Communications Module

Next, at step 312, after transmitting to the server both the first user request and the first system request, the wireless communications module 212 in the wireless communications device 102 is inactivated.

In some implementations of the method 300, before step 312, a further step is implemented of determining whether a response from the server 112 to the transmitted first system request for data and/or the first user request for data is required. Responsive to a determination that a response from the server is required for the first system request for data and/or the first user request for data, the step 312 is executed after the required response(s) from the server 112 is received. In other words, the wireless communications module 212 remains active until the response(s) from the server 112 is received, and is inactivated after the response(s) from the server 112 has been received.

In some implementations of the method 300, more than one user request for data and/or system request for data are transmitted to the server 112 in step 310, as described above. In this case, in implementations where the further step of determining whether a response from the server 112 is required, the step 312 is executed after the response from the server 112 is received responsive to a determination that a response is required for one or more of the requests for data transmitted in step 310.

An alternative embodiment of the methods provided herein is now described with reference to FIG. 4. In some embodiments of the present technology, the method 400 of FIG. 4 can be executed by the data access application 108.

Figure 4:
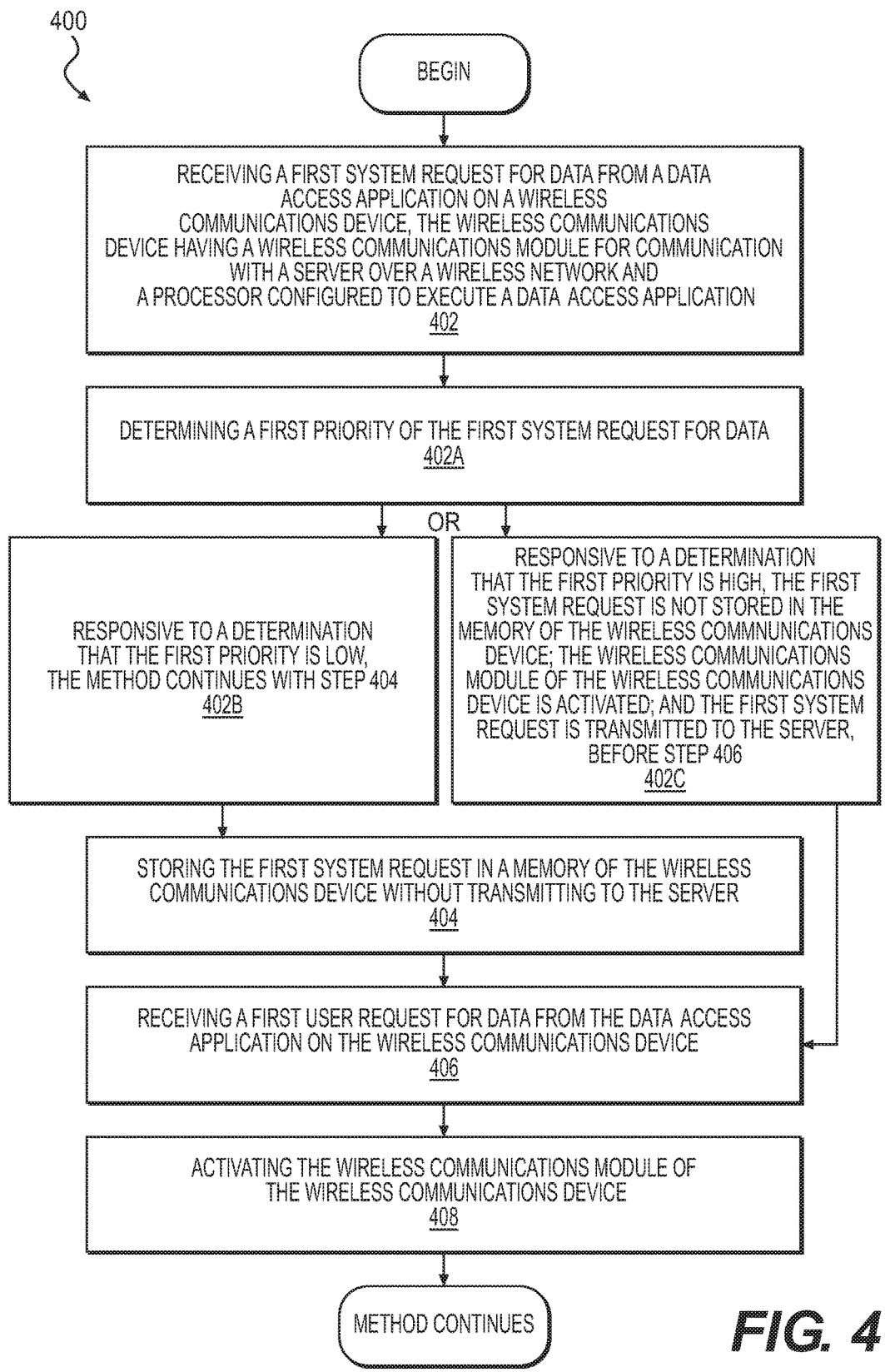
FIG. 4 depicts a flow chart of one embodiment of the method 400, the method 400 being executable within the system 100 of FIG. 1, the method 400 being implemented in accordance with non-limiting embodiments of the present technology.

In the embodiment shown in FIG. 4, the method 400 begins with step 402, which is the same as step 302 described above. The method 400 then proceeds to step 402A.

Step 402A—Determining a First Priority of the First System Request for Data

In step 402A, a first priority of the first system request for data is determined. In general, priority of a system request for data may be either "high" or "low" and is determined according to a predefined set of criteria. Alternatively, the priority of the system request can be determined on a scale of "low", "medium" and "high". Alternatively, the priority of the system request can be determined according to a sliding case, for example, based on zero to 100 or any other suitable sliding scale.

Criteria for determining priority can vary depending on many factors, such as, without limitation: need for a response from the server 112; importance of the request to the functioning of the wireless communications device 102, e.g., whether the data requested is critical for ongoing functioning of the wireless communications device 102, or merely for optimizing functions or for "housekeeping"; time-dependence of the request for data; available power or battery resources; and so on. The criteria for determining priority are not meant to be particularly limited and may include a wide variety of factors, as will be appreciated by the artisan skilled in the field.

In some embodiments of the present technology, the priority of a given system request for data may be pre-determined by the manufacturer of the wireless communications device 102 and may be pre-stored in the memory module 204. As an example, the priority for the given system request for data (as well as other possible system requests for data) may be pre-defined as part of a factory pre-set operating system. Alternatively or additionally, priority for system requests associated with specific ones of the plurality of applications 104 may be pre-determined by the providers of such specific ones of the plurality of applications 104. Within these embodiments, as part of determining priority, the pre-stored priority of the given system request for data is retrieved from the memory module 204. Alternatively, the priority may be determined in real time for the given system request for data based on the factors listed above or other factors, which will become apparent to those of skill in the art.

In alternative embodiments, criteria for determining priority are pre-set by the user, for example based on the user's preferences for performance of the wireless communications device 102.

In some implementations, in the embodiment shown in FIG. 4, responsive to a determination that the first priority of the first system request for data is low (or any other suitable level of priority if a non-binary scale is used, for example, "low" and "medium" or below 50 on the scale of zero to 100), the method 400 then proceeds to steps 402B and 404.

Steps 402B and 404—Responsive to a Determination that the First Priority is Low, Storing the First System Request in a Memory of the Wireless Communications Device without Transmitting to the Server When the first priority of the first system request is low (or any other suitable level of priority if a non-binary scale is used, for example, "low" and "medium" or below 50 on the scale of zero to 100), the first system request is stored in a memory of the wireless communications device 102 without transmitting to the server 112. The method 400 then continues with steps 406 and 408, which are the same as steps 306 and 308 described above.

In alternative implementations, in the embodiment shown in FIG. 4, responsive to a determination that the first priority of the first system request for data is high (or any other suitable level of priority if a non-binary scale is used, for example, "medium" and "high" or above 50 on the scale of zero to 100), the method 400 then proceeds to step 402C.

Step 402C—Responsive to a Determination that the First Priority is High, the First System Request is Not Stored in the Memory of the Wireless Communications Device; the Wireless Communications Module of the Wireless Communications Device is Activated; and the First System Request is Transmitted to the Server In step 402C, where the first priority of the first system request for data is high (or any other suitable level of priority if a non-binary scale is used, for example, "medium" and "high" or above 50 on the scale of zero to 100), then the method 400 does not continue to step 404.

Instead, responsive to the first priority being high (or any other suitable level of priority if a non-binary scale is used, for example, "medium" and "high" or above 50 on the scale of zero to 100), the wireless communications module 212 is activated and the first system request is transmitted to the server 212, regardless of whether a first user request has been received.

Should a first user request be received shortly thereafter, the method 400 will continue with step 406 of receiving the first user request etc., as described above in reference to step 306.

Should a first user request not be received shortly thereafter, the method 400 will continue with the step of inactivating the wireless communications module (not shown in FIG. 4; described above with reference to step 312), after the transmitting of the first system request for data to the server 212.

In implementations that include a further step of determining whether a response from the server 112 is required, the step of inactivating the wireless communications module (same as step 312) is executed after the response from the server 112 is received, responsive to a determination that response from the server 112 is required.

In alternative implementations of the method 400 (not depicted), a second system request for data is received, before step 406 (in other words, before the first user request for data is received). In such implementations, the second system request for data is stored in the memory of the wireless communications device 102 without transmitting to the server 112, and will be transmitted to the server 112 in a step similar to step 310 (in other words, with the first user request for data and the first system request for data, the first system request for data having been stored in the memory of the wireless communications device 102 in step 404). In some implementations, a further step of determining a second priority of the second system request for data is executed.

Responsive to a determination that the second priority is low, the method continues with the step of storing the second system request in the memory of the wireless communications device 102 without transmitting to the server 112. The second system request for data will then be transmitted to the server 112 in a step similar to step 310 (in other words, with the first user request and the first system request, the first system request for data having been stored in the memory of the wireless communications device 102 in step 404).

Alternatively, responsive to a determination that the second priority is high, the second system request for data is not stored in the memory of the wireless communications device 102; the wireless communications module 212 of the wireless communications device 102 is activated; and the second system request for data as well as the first system for request for data (the first system request for data having been stored in the memory of the wireless communications device 102 in step 404) are transmitted to the server 112.

As in step 402C above, in this case the first system request and the second system request are transmitted to the server 112 regardless of whether a first user request has been received. Nevertheless, should a first user request be received shortly thereafter, the method 400 will continue with step 406 of receiving the first user request and so on, as described above. Should a first user request not be received shortly thereafter, the method 400 will continue with a step similar to step 312 of inactivating the wireless communications module 212, after the transmitting of the second system request and the first system request for data to the server 212.

In implementations that include a further step of determining whether a response from the server 112 is required, the step similar to step 312 is executed after the response from the server 112 is received, responsive to a determination that a response from the server is required for the second system request and/or the first system request.

In some embodiments of the present technology, execution of methods provided herein serves to reduce power consumption in the wireless communication device 102. For example, activating the wireless communications module 212 only when a first user request for data is received, and/or only when a high-priority first or second system request for data is received, may lead to a reduced number of activations/inactivations of the wireless communications module 212, reducing consumption of power from the power source module 218.

Similarly, in some implementations, inactivating the wireless communications module 212 after transmitting a request for data to the server 212 or after receiving a response from the server 212, where such a response is required, may lead to a reduction in the amount of time the wireless communications module 212 is kept active, thereby reducing consumption of power from the power source module 218. In further implementations, storing low-priority system requests for data in the memory module 204 of the wireless communications device 102 until a first user request for data is received, and then transmitting the low-priority system requests and the user request together, serves to reduce power consumption.

Even though the description of the methods 300, 400 has been provided in some embodiments with an example of a single system request for data and a single user request for data, it should be understood that, in alternative embodiments, a single request for data can comprise a plurality of requests for data.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A method of operating a wireless communications device, the wireless communications device having a wireless communications module for communication with a server over a wireless network and a processor, operatively coupled to the wireless communications module, the processor being configured to execute a data access application, the method comprising:
   receiving a first system request for data from the data access application on the wireless communications device, the first system request corresponding to a non-user originating request;
   storing the first system request in a memory of the wireless communications device without activating the wireless communication module of the wireless communications device;
   receiving a first user request for data from the data access application on the wireless communications device, the first user request corresponding to a request originating from a user associated with the wireless communications device;

transmitting, to the server both the first user request and the first system request only in response to the receiving the first user request, the transmitting comprising activating the wireless communications module of the wireless communications device, the activating occurring only upon receiving the first user request; and inactivating the wireless communications module.

2. The method of claim 1, wherein, responsive to a response from the server being required after said transmitting, executing said inactivating after the response from the server is received.

3. The method of claim 1, further comprising the step of: before storing the first system request, determining a first priority of the first system request for data.

4. The method of claim 3, wherein, responsive to a determination that the first priority is low, storing the first system request in a memory of the wireless communications device without transmitting to the server.

5. The method of claim 3, wherein, responsive to a determination that the first priority is high, the first system request is not stored in the memory of the wireless communications device; the wireless communications module of the wireless communications device is activated; and the first system request is transmitted to the server, before the first user request is received.

6. The method of claim 3, further comprising the steps of:
before receiving the first user request, receiving a second system request for data from the data access application on the wireless communications device, and storing the second system request in the memory of the wireless communications device without transmitting to the server; and
wherein, the second system request is transmitted to the server with the first user request and the first system request.

7. The method of claim 6, further comprising the step of:
before storing the second system request in the memory of the wireless communications device without transmitting to the server, determining a second priority of the second system request for data.

8. The method of claim 7, wherein, responsive to a determination that the second priority is low, the method continues with the step of storing the second system request in the memory of the wireless communications device without transmitting to the server.

9. The method of claim 7, wherein, responsive to a determination that the second priority is high, the second system request is not stored in the memory of the wireless communications device; the wireless communications module of the wireless communications device is activated; and both the second system request and the stored first system request are transmitted to the server, before the first user request is received.

10. A wireless communications device comprising:
a wireless communications module for communication with a server over a wireless network; and
a processor, operatively coupled to the wireless communications module, the processor being configured to execute an operating system of the wireless communications device and a data access application, the data access application configured to:
receive a first system request for data from the operating system of the wireless communications device, the first system request corresponding to a non-user originating request;
store the first system request in a memory of the wireless communications device without activating the wireless communication module of the wireless communications device;
receive a first user request for data, the first user request corresponding to a request originating from a user associated with the wireless communications device;
transmit to the server both the first user request and the first system request only in response to receiving the first user request, to transmit the first user request and the first system request, the data access application being configured to activate the wireless communications module of the wireless communications device, the activating occurring only upon receiving the first user request; and
inactivate the wireless communications module.

11. A method for reducing power consumption in a wireless communications device, the wireless communications device having a wireless communications module for communication with a server over a wireless network and a processor, operatively coupled to the wireless communications module, the processor being configured to execute a data access application, the method comprising:
receiving a first system request for data from the data access application on the wireless communications device, the first system request corresponding to a non-user originating request;
storing the first system request in a memory of the wireless communications device without activating the wireless communication module of the wireless communications device;
receiving a first user request for data from the data access application on the wireless communications device, the first user request corresponding to a request originating from a user associated with the wireless communications device;
transmitting, to the server both the first user request and the first system request only in response to the receiving the first user request, the transmitting comprising activating the wireless communications module of the wireless communications device, the activating occurring only upon receiving the first user request; and
inactivating the wireless communications module.

12. The method of claim 11, wherein, responsive to a response from the server being required after said transmitting, executing said inactivating after the response from the server is received.

13. The method of claim 11, further comprising the step of:
before storing the first system request, determining a first priority of the first system request for data.

14. The method of claim 13, wherein, responsive to a determination that the first priority is low, storing the first system request in a memory of the wireless communications device without transmitting to the server.

15. The method of claim 13, wherein, responsive to a determination that the first priority is high, the first system request is not stored in the memory of the wireless communications device; the wireless communications module of the wireless communications device is activated; and the first system request is transmitted to the server, before the first user request is received.

16. The method of claim 13, further comprising the steps of:
before receiving the first user request, receiving a second system request for data from the data access application on the wireless communications device, and storing the second system request in the memory of the wireless communications device without transmitting to the server; and wherein, the second system request is transmitted to the server with the first user request and the first system request.

17. The method of claim 16, further comprising the step of: before storing the second system request in the memory of the wireless communications device without transmitting to the server, determining a second priority of the second system request for data.

18. The method of claim 17, wherein, responsive to a determination that the second priority is low, the method continues with the step of storing the second system request in the memory of the wireless communications device without transmitting to the server.

19. The method of claim 17, wherein, responsive to a determination that the second priority is high, the second system request is not stored in the memory of the wireless communications device; the wireless communications module of the wireless communications device is activated; and both the second system request and the stored first system request are transmitted to the server, before the first user request is received.

* * * * *